United States Patent

Michell et al.

[11] Patent Number: 5,946,995
[45] Date of Patent: Sep. 7, 1999

[54] METHOD AND APPARATUS FOR CURVE SAWING OR TRAVERSE EDGING WITH AN ACTIVE SAWBOX

[75] Inventors: Steven W. Michell; Emeric Johnson; Brian Stroud; James Jackson; John Sergeant, all of Salmon Arm, Canada

[73] Assignee: CAE Electronics Ltd. CAE Electronique Ltee, St. Laurent, Canada

[21] Appl. No.: 08/929,230

[22] Filed: Sep. 9, 1997

Related U.S. Application Data

[60] Provisional application No. 60/019,756, Sep. 9, 1996.

[51] Int. Cl.[6] .................................................. B27B 1/00
[52] U.S. Cl. .......................... 83/425.3; 83/368; 83/371; 83/425.4; 83/485; 83/487; 83/498; 83/508.3; 144/39; 144/357; 144/3.1; 144/378
[58] Field of Search ................................ 144/3.1, 39, 41, 144/237, 356, 357, 377, 378; 83/170, 368, 371, 425.2, 425.3, 425.4, 446, 482, 497, 498, 495, 504, 508.3

[56] References Cited

U.S. PATENT DOCUMENTS

| | | |
|---|---|---|
| 4,239,072 | 12/1980 | Merilainen . |
| 4,373,563 | 2/1983 | Kenyon . |
| 4,383,561 | 5/1983 | Gregroire et al. . |
| 4,449,557 | 5/1984 | Makela et al. ........................... 144/378 |
| 4,485,861 | 12/1984 | Nilsson et al. ........................... 144/357 |
| 4,572,256 | 2/1986 | Rautio . |
| 4,599,929 | 7/1986 | Dutina . |
| 4,690,188 | 9/1987 | Hasenwinkle . |
| 4,881,584 | 11/1989 | Wislocker et al. . |
| 5,148,847 | 9/1992 | Knerr . |
| 5,320,153 | 6/1994 | Knerr . |
| 5,396,938 | 3/1995 | Cannalay ................................ 144/378 |
| 5,400,842 | 3/1995 | Brisson . |
| 5,429,161 | 7/1995 | Allard . |
| 5,469,904 | 11/1995 | Kontianen . |
| 5,722,474 | 3/1998 | Raybon et al. ........................ 144/357 |

FOREIGN PATENT DOCUMENTS

2022857  8/1996  Canada .

*Primary Examiner*—W. Donald Bray
*Attorney, Agent, or Firm*—Antony C. Edwards

[57] ABSTRACT

An edging and curve-sawing saw has a selectively skewable sawbox, skewable to a workpiece infeed path so as to receive workpieces translated longitudinally along the infeed path and into the sawbox. The sawbox rotatably supports a saw arbor. A plurality of saw blades are slidingly mounted on the saw arbor in a parallel laterally spaced array. The saw blade array spacing is selectively adjustable device mounted to the sawbox. The array is slide on the arbor relative to the sawbox according to an optimized profile.

14 Claims, 7 Drawing Sheets

METHOD AND APPARATUS FOR CURVE SAWING OR TRAVERSE EDGING WITH AN ACTIVE SAWBOX

CROSS REFERENCE TO RELATED APPLICATION

This application claims priority from U.S. Provisional Application Ser. No. 60/019,756, filed Sep. 9, 1996, titled Method and Apparatus for Curve Sawing or Traverse Edging with an Active Sawbox.

FIELD OF THE INVENTION

This invention relates to a method and an apparatus for curve sawing cants or edging boards or flitches, for lumber, and in particular relates to an active sawbox system, for the curve sawing of cants, or the transverse edging of a board according to an optimized profile for optimum curve sawing of cants, or edging of flitches, with an active sawbox.

BACKGROUND OF THE INVENTION

A canted log, or "cant", by definition has first and second opposed cut planar faces. In the prior art, cants were fed linearly through a profiler or gang saw so as to produce at least a third planar face either approximately parallel to the center line of the cant, so called split taper sawing, or approximately parallel to one side of the cant, so called full taper sawing; or at a slope somewhere between split and full taper sawing. For straight cants, using these methods for volume recovery of the lumber can be close to optimal. However, logs often have a curvature and usually a curved log will be cut to a shorter length to minimize the loss of recovery due to this curvature. Consequently, in the prior art, various curve sawing techniques have been used to overcome this problem so that longer length lumber with higher grade recovery may be achieved.

Curve sawing typically uses a mechanical centering system that guides a cant into a secondary break-down machine with chipping heads or saws. This centering action results in the cant following a path very closely parallel to the center line of the cant, thus resulting in split taper chipping or sawing of the cant. Cants that are curve sawn by this technique generally produce longer, wider and stronger boards than is typically possible with a straight sawing technique where the cant has significant curvature.

Curve sawing techniques have also been applied to cut parallel to a curved face of a cant, i.e. full taper sawing. See for example Kenyan, U.S. Pat. No. 4,373,563 and Lundstrom, Canadian Patent No. 2,022,857. Both the Kenyan and Lundstrom devices use mechanical means to center the cant during curve sawing and thus disparities on the surface of the cant such as scars, knots, branch stubs and the like tend to disturb the machining operation and produce a "wave" in the cant. Also, cants subjected to these curve sawing techniques tend to have straight sections on each end of the cant. This results from the need to center the cant on more than one location through the machine. That is, when starting the cut, the cant is centered by two or more centering assemblies until the cant engages anvils behind the chipping heads. When the cant has progressed to the point that the centering assemblies in front of the machine are no longer in contact, the cant is pulled through the remainder of the cut in a straight line. It has also been found that full taper curve sawing techniques, because the cut follows a line approximately parallel to the convex or concave surface of the cant, can only produce lumber that mimics these surfaces, and the shape produced may be unacceptably bowed.

Thus in the prior art, so called arc-sawing was developed. See for example U.S. Pat. Nos. 5,148,847 and 5,320,153. Arc sawing was developed to saw irregular swept cants in a radial arc. The technique employs an electronic evaluation and control unit to determine the best semi-circular arc solution to machine the cant, based, in part, on the cant profile information. Arc sawing techniques solve the mechanical centering problems encountered with curve sawing but limit the recovery possible from a cant by constraining the cut solution to a radial form.

Applicant is aware of attempts in the prior art to curve sawing by pivoting or skewing the gangsaw, and in particular, U.S. Pat. No. 4,599,929 which issued to Dutina. Dutina teaches curve sawing where each saw guide and/or saw axle is adjusted in view of the average inclination over the sawing line of the entire longitudinal profile of the workpiece or of parts of the longitudinal profile.

Applicant is also aware of U.S. Pat. No. 4,373,563, U.S. Pat. No. 4,572,256, U.S. Pat. No. 4,881,584, U.S. Pat. No. 5,320,153, U.S. Pat. No. 5,400,842 and U.S. Pat. No. 5,469,904, which all relate to the curve sawing of two-sided cants.

It has been found that optimized lumber recovery is best obtained for most if not all cants if a unique cutting solution is determined for every cant. Thus for each cant a "best" curve is determined, which in some instances is merely a straight line parallel to the center line of the cant, and in other instances a complex curve that is only vaguely related to the physical surfaces of the cant.

Thus it is an object of the present invention to improve recovery of lumber from cants and in particular irregular or crooked cants by employing a "best" curve and a unique cutting solution for each cant. To achieve this objective a two-sided cant is positioned and accurately driven straight into an active curve sawing gang, to produce the "best" curve which includes smoothing technology.

A board, or "flitch", by definition has first and second opposed cut planar faces and first and second opposed waned edges. In one prior art method, flitches would be scanned and sequenced horizontally then positioned in the desired skew, if any, and then clamped by feed rolls to be fed linearly into a conventional edger. In a second prior art method, flitches would be centered in the direction of flow and then translated through a linear scanner and, in the same direction, into a conventional edger. The first approach is effective, but the system is quite expensive and the positioning of the flitch takes extra time. The second approach works for uniform straight flitches, but causes a loss of recovery when the flitches are crooked or flared on one side.

Different methods of lineal scanning and positioning have been proposed. U.S. Pat. No. 4,239,072 (Meriläinen) discloses a lineal scanning and skew edging process. It lacks the ability to produce high quality chips at higher feed speeds and does not allow for multiple saws. U.S. Pat. No. 4,449,557 (Mäkelä) discloses a similar process, but without the ability to reduce the edgings to chips. It also does not allow for multiple saws.

U.S. Pat. No. 5,429,161 (Allard) discloses a linear scanning edger process. The apparatus positions the flitch while the flitch is moving, with two pairs of tandem (top and bottom) clamp rollers that skew the flitch as it is moving up to the edger. This process relies on the twisting of the flitch as it moves through the roller clamps, which causes skidding of the flitch between the rollers as they are skewed. The variance in friction between different flitches and the rollers and the difference in the direction of the rollers' axis and the direction of the flitch as it travels through the roller clamps, can cause a margin of error that reduces the recovery percentage.

It has been found that optimized lumber recovery is more easily obtained by merely roughly, that is, non-accurately, placing the flitch or other workpiece on a conveyor, then conveying the flitch or workpiece through a lineal scanner, and straight through an edger where, instead of positioning the flitch, the saws and chip heads adjust and then traverse, to saw and chip the flitch. Because chip heads replace the outer saws, the need to handle the edgings after they exit the edger is eliminated. This eliminates a "tailer" which is normally used to separate the edgings and also the need for extra conveyors to transport the edgings.

The present invention skews the saws and guides about a vertical axis perpendicular to the flow by skewing the sawbox and translates the saws and guides transversely to the flow within the sawbox, that is, relative to the sawbox, to accomplish active curve sawing of a workpiece.

It is an object of the present invention to improve the efficiency of lumber production from workpieces, and in particular from irregular or crooked workpieces. A workpiece moves straight in the direction of flow through the curve sawing sawbox, where the saws and/or chip heads skew and actively translate in unison to saw and/or chip the flitch.

It is a further object of the present invention to improve the efficiency of the lumber production from flitches and in particular for irregular or crooked flitches, by employing scanning and a traversing edger which follows the cutting solution for each flitch as is determined by the optimizer from the scanned profile of the flitch and the desired lumber sizes. This objective is achieved by not positioning the flitch with extra machinery, but rather to place the flitch approximately correctly positioned and then feed the flitch through a scanner and then into an edger, adjusting the skew and then actively traversing the edger, to produce the desired recovery percentage.

It is also an object of the present invention to provide: (a) a sawbox capable of variable lumber target sizes, that allows the setting of different saw blade spacings thereby reducing the number of saw blades needed in mills where lumber widths vary, (b) a sawbox of reduced weight and size capable of larger sawing zones, (c) a sawbox requiring less travel because of its increased sawing zone capability, and, (d) a sawbox having a reduced response time.

It is another object of the present invention to eliminate, by the use of chip heads within the active curve sawing edger, the need to handle edgings behind the sawbox and at the same time improving the chip quality produced from the edgings.

SUMMARY OF THE INVENTION

The apparatus of the present invention is capable of both curve sawing cants, or traverse edging of flitches, more efficiently, and to optimize recovery, based on the measured cant or flitch shape, lumber value, operator input and mill requisites.

An unscrambler receives and separates the workpiece from the mill and then feeds single workpieces onto an even ending roll case having a live fence. The ending rolls even end the workpieces against the live fence, and then transfer the workpieces to a sequencing transfer. The sequencing transfer gathers, advances and holds the workpieces for timed release, to queue the workpiece for release onto an angled roll case, or other translation means, which roughly positions the workpieces against a fence, also known as a line bar. The angled roll case feeds workpieces singly on to a wide circulating belt, which moves each workpiece through a scanner, where the scanner reads the profile of each workpiece and sends the data to a decision processor system. It is to be understood that it is within the scope of the present invention that scanning may be done at any point upstream of the active sawbox.

If the mill area does not allow for a lineal scanning layout, that is, the mill does not have the physical area for a lineal scan system, a transverse scanner may be employed.

An optimizing algorithm in the decision processor generates a three dimensional model from the workpiece measurements and calculates the cutting solution. Data is then transmitted to a programmable logic controller (PLC) that in turn sends motion control information related to the optimum breakdown solution to an active sawbox to control the position and the movement of the saws.

The workpiece moves from the scanner along the belt and up to a sharpchain positioned just in front of the active sawbox, where overhead driven press rolls above the sharpchain press down on the workpiece and feed the workpiece straight into the active sawbox. The saws follow an optimum path for the workpiece to produce the desired recovery.

In an alternative embodiment, chip heads may replace the outer saws on the saw arbor in the sawbox to reduce the outer slabs or edgings of the workpiece into chips. These chip heads may, although are not required to, have internal reduction planetary gears that allow the chip heads to rotate at a lower speed than the saws, as the chip heads are mounted on the same arbor as the saws. The planetary gear diameters are set so to allow an optimum speed of the chipping heads, to help create quality chips.

The active sawbox apparatus uses a plurality of overhead pressrolls, with an underside circulating sharpchain in the infeed area. The infeed area may also have fixed split bedrolls. The outfeed area may also have non-split bedrolls and a plurality of overhead pressrolls. The workpiece is pressed from the top by the overhead pressrolls onto the lower infeed sharpchain and bedrolls for feeding the workpiece straight into the sawbox. The saws adjust for desired cut width. The saw spacing is then fixed. The sawbox actively skews, while the arbor, with saws and guides, actively translate in unison so as to create the optimum lumber and thus optimum recovery percentage from the workpiece. The workpiece translates through the sawbox straight, in the direction it was scanned. Thus, in curve sawing the workpiece, the sawbox skews and translates to follow an optimum curve as the workpiece passes straight through the sawbox apparatus, where the optimum curve has been decided by the optimizer from the scanned image of the workpiece.

In the sawbox apparatus, when edging, the saws adjust for width and skew, and then position for starting. They then translate in unison as needed, thus cutting along the edge path that has been determined by the optimizer, as the workpiece passes.

Saw guide pairs are held together by clamping means and are connected to the saw shifting block by a removable means which allows the saw guides to be lifted up over the saw blades, after the clamping means is released.

When using chip heads in place of the outer saws on the saw arbor, an adjustable anvil (adjustable to the thickness of the workpiece) is positioned over the workpiece and closely adjacent the chip heads. The anvil gives the chipping action a shear point, thus assisting in producing a clean edge on the workpiece. The chip heads may be drum-like with angled cutting knives that slice rather than chop the slabs or edgings, thus producing better chip quality.

In summary, the selectively adjustable edging and curve-swing saw of the present invention comprises:

a selectively skewable sawbox, skewable in a generally horizontal plane about a vertical axis of rotation relative to an infeed path and positionable in the infeed path so as to receive workpieces translated generally longitudinally along the infeed path and into the sawbox, the sawbox rotatably supporting, on a selectively rotatable generally horizontal saw arbor selectively rotatable about a generally laterally extending horizontal axis of rotation, a plurality of generally vertically and longitudinally aligned saw blades in parallel selectively adjustable laterally spaced array, saw blade array spacing selective adjustment means mounted to the sawbox for selective adjustment of lateral spacing between the saw blades in the parallel selectively adjustable laterally spaced array along the saw arbor, saw translating means for laterally translating the parallel selectively adjustable laterally spaced array relative to the sawbox according to an optimized profile.

In a first aspect of the present invention, where the saws move relative to the saw arbor by sliding along the splines of the saw arbor, the saw blade array spacing selective adjustment means and the saw translating means are selectively positionable laterally translatable parallel rigid members, in the preferred embodiment Y axis positioning cylinders and shafts, extending and translatable generally parallel to the saw arbor. The translatable parallel rigid members are rigidly mounted to saw blade guide means for selective slidable lateral positioning of the saw blades along the saw arbor. Selective lateral positioning of each of the translatable parallel rigid members selectively laterally positions one corresponding saw blade along the saw arbor by one-to-one coupling via a corresponding saw blade guide mounted to a corresponding translatable parallel rigid member.

In a second aspect, where the saw arbor is selectively clamped to all of the rigid members, that is, the Y axis positioning shafts, the saw blade array spacing selective adjustment means arc, as above, selectively positionable laterally translatable parallel rigid members extending and translatable generally parallel to the saw arbor. The translatable parallel rigid members are rigidly mounted to corresponding saw blade guide means or guides for selective slidable lateral positioning of the saw blades along the saw arbor. The selective lateral positioning of each of the translatable parallel rigid members selectively laterally positions one corresponding saw blade, whereby lateral spacing between the saw blades may be adjusted prior to lateral translation of the laterally spaced array of said saw blades. The saw translating means is selectively actuable clamping means:

(a) selectively actuable to selectively rigidly couple a first translatable parallel rigid member of the translatable parallel rigid members to the translatable parallel rigid members other than the first translatable parallel rigid member (hereinafter the remaining translatable parallel rigid members) when the remaining translatable parallel rigid members are free floating by activation of free floating means, such as de-activating the flutter valves on the actuators, cooperating with the translatable parallel rigid members, and (b) coupling the first translatable parallel rigid member to the saw arbor so as to rigidly couple the first translatable parallel rigid member to the saw arbor in a transverse direction along the horizontal axis of rotation and so as to rotatably couple the first translatable parallel rigid member to the saw arbor about the horizontal axis of rotation.

The first translatable parallel rigid member is selectively actuably positionable when the remaining translatable parallel rigid members are free floating. Thus, selective positioning of the first translatable parallel rigid member according to the optimized profile translates the laterally spaced array of the saw blades according to the optimized profile as the workpiece is translated along the feedpath and through the sawbox.

In a third aspect, where the saw blades are slidingly mounted on a sleeve, and the sleeve slidingly mounted on the saw arbor, and the sleeve clamped to one of the Y axis positioning shafts, the array of saw blades are splined and slidingly mounted on a correspondingly externally splined sleeve. The sleeve is internally splined and slidingly mounted on external splines on the saw arbor. Again, the saw blade array spacing selective adjustment means are selectively positionable laterally translatable parallel rigid members extending and translatable generally parallel to the saw arbor, the rigid members rigidly mounted to corresponding saw blade guide means for selective slidable lateral positioning of the saw blades along the sleeve. Selective lateral positioning of each of the rigid members selectively laterally positions one corresponding saw blade along the sleeve by one-to-one coupling via a corresponding saw blade guide. The saw translating means are the translatable parallel rigid members rigidly mounted to the saw blade guide means. At least a first translatable parallel rigid member is clamped, by clamping means, to the sleeve so as to selectively translate the sleeve relative to the saw arbor in unison with the first translatable parallel rigid member.

In a fourth aspect, where the saw blades are slidingly mounted on a sleeve, and the sleeve slindingly mounted on the saw arbor, and the saw arbor selectively clamped to all of the Y axis positioning shafts, at least a first translatable parallel rigid member is selective actuably positionable, and the remaining translatable parallel rigid members are adapted to be selectively free floating when selectively actuable clamping means are selectively actuated to rigidly secure the remaining translatable parallel rigid members to the first translatable parallel rigid member and to the sleeve so as to selectively translate the sleeve relative to the saw arbor in unison with the first translatable parallel rigid member.

In a fifth aspect, where the saw arbor is clamped to one of the Y axis positioning shafts, at least a first translatable parallel rigid member is clamped, by clamping means, to the saw arbor so as to selectively translate the saw arbor in unison with the first translatable parallel rigid member.

Advantageously, in all embodiments, the selectively actuable clamping means is a tie bar rigidly coupled either to the saw arbor, or the sleeve, in a transverse direction along the horizontal axis of rotation, depending on whether the saw arbor or the sleeve is laterally translating. The tie bar is rotatably coupled to the saw arbor or sleeve about the horizontal axis of rotation.

Where the tie bar extends across all of the translatable parallel rigid members, the tie bar includes selectively actuable clamps for rigidly coupling the remaining translatable parallel rigid members to the first translatable parallel rigid member when the remaining translatable parallel rigid members are free floating, that is, following active prepositioning of the saw blades. The clamps clamp the remaining Y axis positioning shafts to thus physically couple the free floating Y axis positioning shafts to the first, active, Y axis positioning shaft governing active lateral translation for curve sawing or edging.

The Y axis positioning shafts may remain actively independently translatable following prepositioning of the saw blades so that each Y axis positioning cylinder actively governs the cutting path of its corresponding saw blade. In those embodiments, the tie bar only extends from the saw arbor or sleeve to the first Y axis positioning shaft.

Further advantageously, the end blades at either end of the array of saw blades may be chipping heads. The array may consist of two or more blades. The chipping heads may, although not necessarily, be coupled by reduction gearing to the saw arbor for optimal rotational speed, the chipping heads chip in chipping planes parallel to the saw blades so as to chip a workpiece translating generally longitudinally into the sawbox for curve sawing and edging. The chipping heads are in line with the saw arbor.

The sawbox may, further, include chipping anvils corresponding to, and cooperating with the chipping heads. The chipping anvils are mounted in close adjacency to arcs of rotation of the chipping blades in the chipping planes, so as to lie at least partially in the chipping planes, to provide a bearing and shearing surface against which a workpiece may bear so as to shear chips from the workpiece as the chipping blades engage the workpiece in the chip cutting engagement. The chipping anvils may be rigid members having generally planar bearing surfaces extending generally horizontally, parallel to the saw arbor, and the chipping blades, as they rotate in the arcs of rotation, to form an acute angle relative to the planar bearing surfaces as the chipping blades are rotated past the chipping anvils.

The reduction gears may be planetary reduction gears, for reducing the rate of rotation of the chipping heads relative to the rate of rotation of the saw blades so as to optimize cutting of the chips from the workpiece.

The invention provides other advantages which will be made clear in the description of the preferred embodiments.

BRIEF DESCRIPTION OF THE DRAWINGS

The invention will be better understood by reference to drawings, wherein:

FIG. 5a is an end section view of the chip head of FIG. 5 along sectional line 5a–5a.

DETAILED DESCRIPTION OF PREFERRED EMBODIMENTS

Referring to the drawing figures wherein similar characters of reference represent corresponding parts in each view, the active sawbox apparatus of the present invention is generally indicated by the reference numeral 10.

Figure 1:
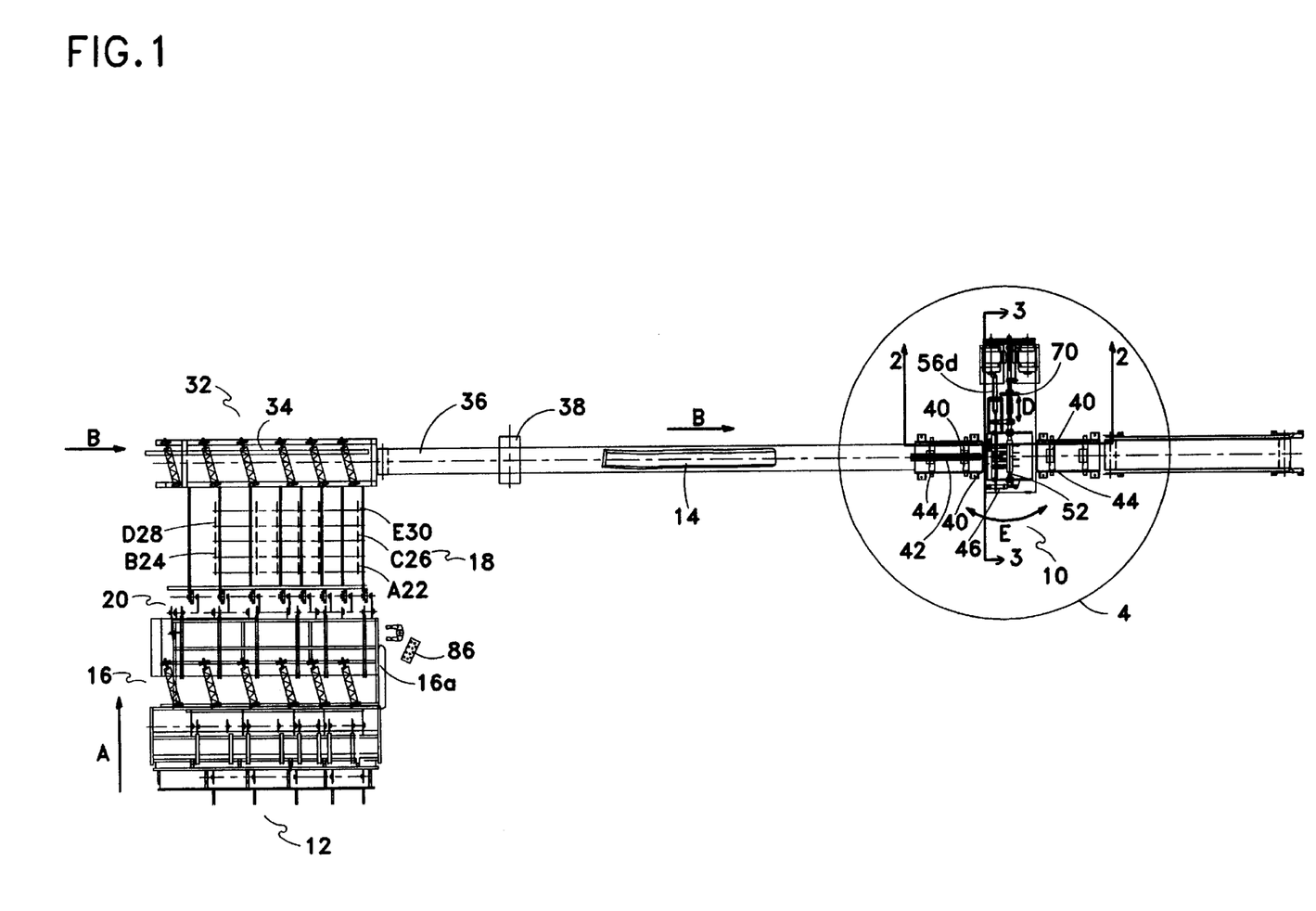
FIG. 1 is a plan view showing the active sawbox system of the present invention.

As seen in FIG. 1, an unscrambler 12 receives the workpiece 14 from the mill (direction A) and separates the workpiece 14 and then feeds the workpiece 14 onto an even ending roll case 16 which ends the workpiece 14 onto live fence 16a, and then transfers the workpiece 14 on to a sequencing transfer 18, or a drop out 20. Dropout 20 allows the operator to reject a workpiece before it moves on to the sequencing transfer 18. Sequencing transfer 18 includes ducker A22, where workpiece 14 is sent from ducker A22 to ducker B24 when ducker B24 becomes available. Sequencing transfer 18, includes ducker C26, where workpiece 14 is sent to ducker C26 from ducker B24 when ducker C26 becomes available. Sequencing transfer 18, includes ducker D28, where workpiece 14 is sent to ducker D28 from ducker C26 when ducker D28 becomes available. Seuqencing transfer 18, includes ducker E30, where workpiece 14 is sent to ducker E30 from ducker D28 when ducker E30 becomes available.

Figure 6:
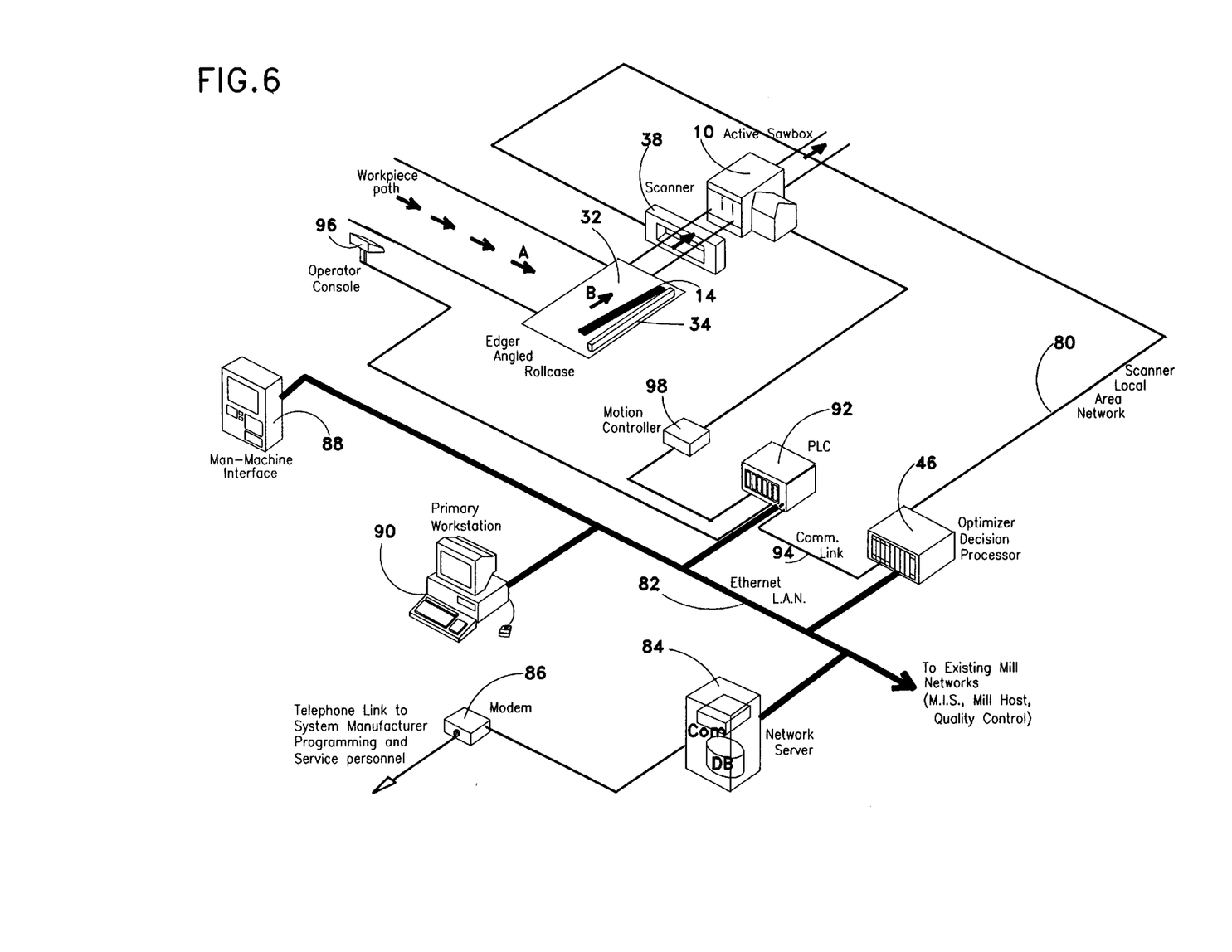
FIG. 6 is a diagrammatic view of the overall mill system incorporating the present invention.

Angled rollcase 32 receives workpiece 14 from ducker E30 when angled rollcase 32 becomes available. As also seen in FIG. 6, angled rollcase 32 moves workpiece 14 up to a fence 34, where, once workpiece 14 contacts fence 34, the angled rollcase 32 begins to move workpiece 14 in direction B. Workpiece 14 moves along angled rollcase 32 and fence 34, and then onto a wide belt 36 which continues to move workpiece 14 in direction B. Workpiece 14 continues to move in direction B through lineal scanner 38, where the lineal scanner 38 obtains an image of workpiece 14.

Figure 2:
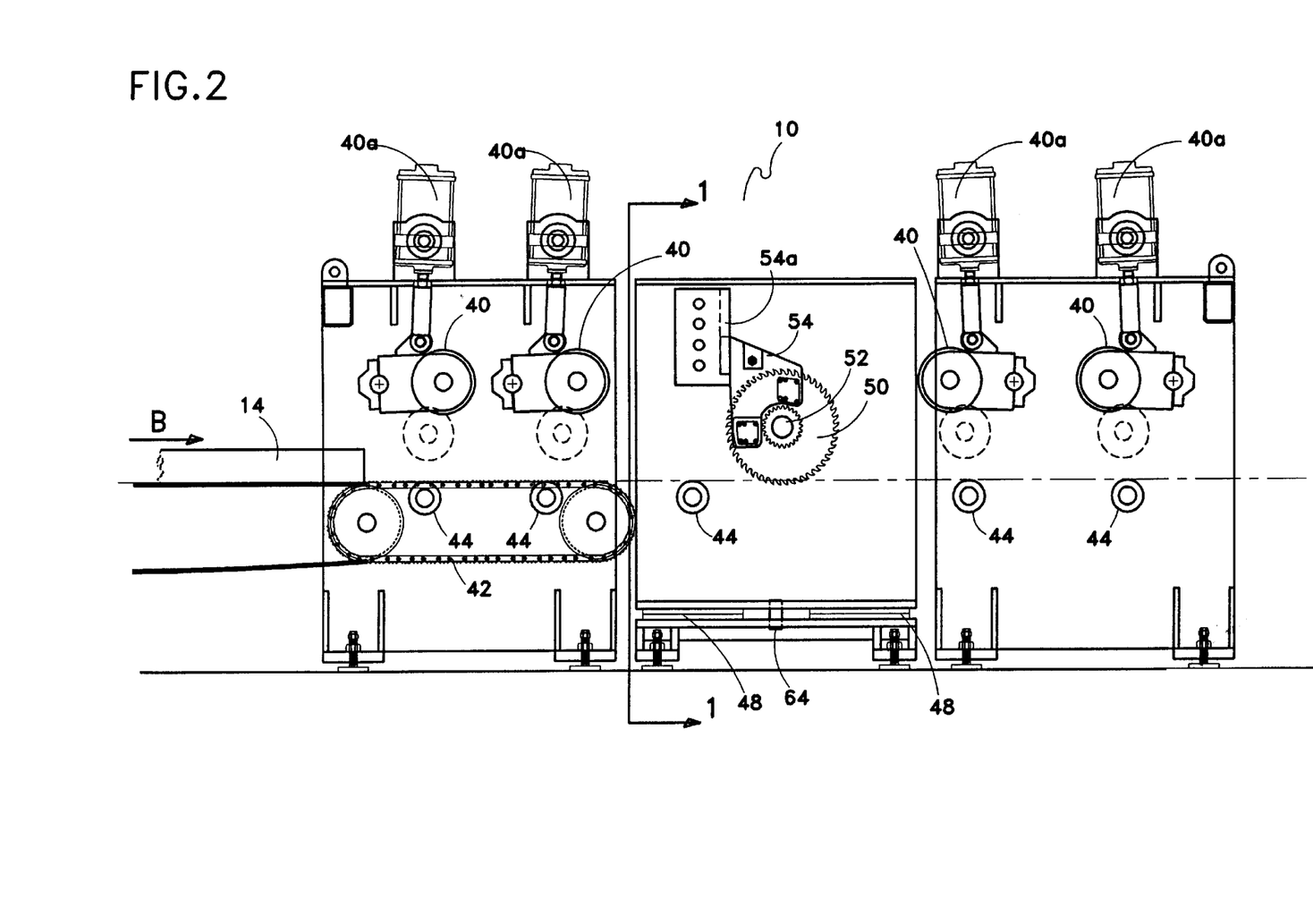
FIG. 2 is a side elevation cross-sectional view according to a preferred embodiment of the invention, along section line 2—2 in FIGS. 1 and 4.
Figure 4:
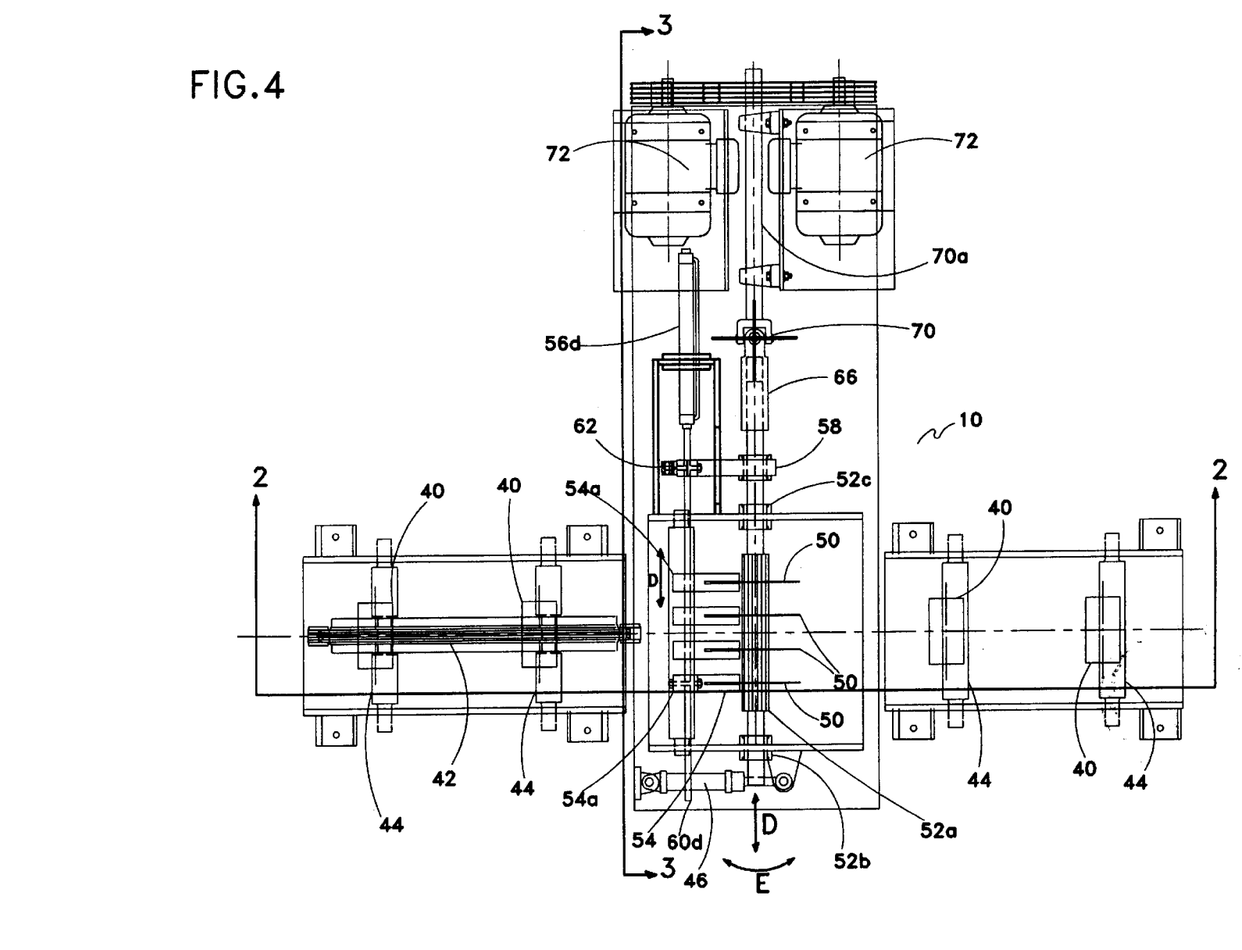
FIG. 4 is an enlarged section plan view, taken from FIG. 1.

As best seen in FIGS. 2 and 4, a plurality of driven pressrolls 40, actuated by pressroll cylinders 40a seen in FIG. 2, receive workpiece 14 prior to entering sawbox apparatus 10. Pressrolls 40 press down to hold workpiece 14 against sharpchain 42 and split bedrolls 44. Driven pressrolls 40 and sharpchain 42 drive workpiece 14 in a straight line in direction B into sawbox apparatus 10.

The image of workpiece 14 from scanner 38 is sent to an optimizer decision processor 46 seen in FIG. 6, where the image is processed. The processed decision information is exported to sawbox apparatus 10 where sawbox apparatus controllers (not shown) activate X axis positioning cylinder 46 and Y axis positioning cylinders 56a, 56b, 56c and 56d which may be Temposonic (TM) cylinders, seen in FIGS. 3 and 4.

Figure 3:
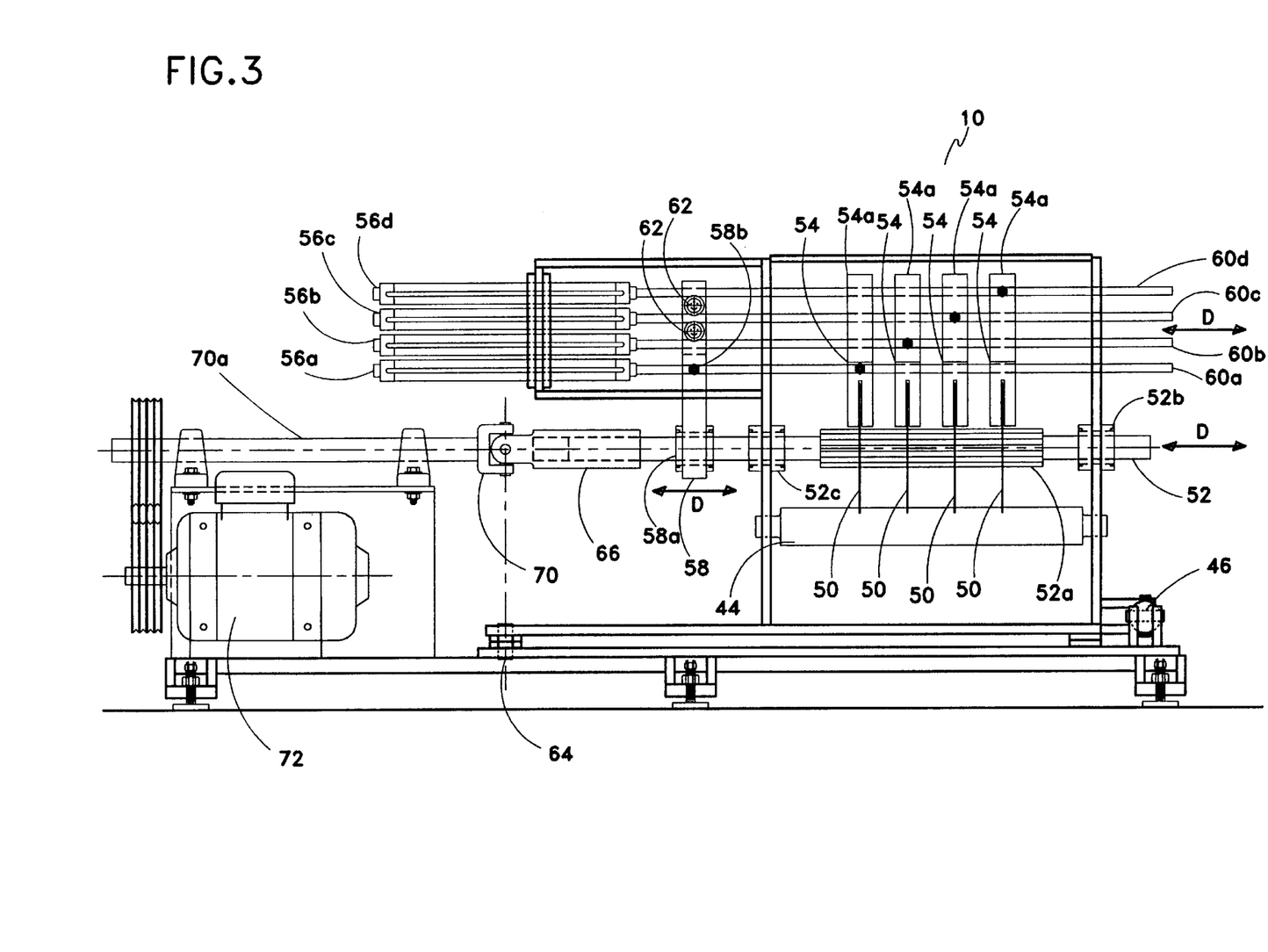
FIG. 3 is an end elevation cross-sectional view according to a preferred embodiment of the invention, along section line 3—3 in FIGS. 1 and 4.

In a first preferred embodiment, seen in FIGS. 3 and 4, once the Y axis positioning cylinders have been positioned for the desired lumber target size, thereafter they are actuated in unison with saw arbor 52 so that the Y axis positioning cylinder shafts, the saw arbor, the saw guides, and the saw blades are translated laterally and actively according to the optimized cutting and edging profile.

Once Y axis positioning cylinders 56a, 56b, 56c and 56d, are actuated to position saws 50 and saw guides 54 for desired width of cut. Tie bar 58 is actuated by means of tie bar clamp cylinders 62 to clamp, that is, to restrain, further independent movement of Y axis positioning cylinder shafts 60b, 60c and 60d relative to shaft 60a. Y axis positioning cylinders 56b, 56c and 56d are released to "float" once tie bar 58 clamps Y axis positioning cylinder shafts 60b, 60c and 60d. Y axis positioning cylinder shaft 60a is fixed to tie bar 58 by means of bolt 58b. Tie bar 58 is rotatably mounted to arbor 52, by thrust bearing 58a.

Once saws 50 are positioned, Y axis positioning cylinder 56a is actuated to move saw guides 54, saw guides blocks 54a, arbor 52, tie bar 58, and saws 50, so as to translate saws 50 in unison in direction D within sawbox 10 while sawbox 10 skews in direction E on pin 64 by means of X axis positioning cylinder 46. Arbor 52 has raised splines 52a. Splines 52a slidingly journal in correspondingly splined saws 50. Arbor 52 rotatably slides in bearings 52b and 52c. Arbor 52 and saws 50 translate in direction D. Splined slip joint 66 at the end of arbor 52, near U-joint 70, allows motors 72 to remain stationary as arbor 52 and saws 50 actively skew and translate to follow the optimized path. Translation of arbor 52 and saws 50, rather than translation of the entire sawbox 10 reduces the moving weight of sawbox 10 and thereby reduces the response time of the sawbox when following the optimized cutting or edging profile of workpiece 14.

In a second preferred embodiment, arbor 52 is not fixed to Y axis positioning cylinder shaft 60a, but rather, saws 50 are moved relative to arbor 52 by Y axis positioning cylinders 56a, 56b, 56c and 56d, acting in unison to slide saws 50 over splines 52a. Thus, in this embodiment, tie bar 58, tie bar clamp cylinders 62, and splined slip joint 66 are not required.

Figure 3A:
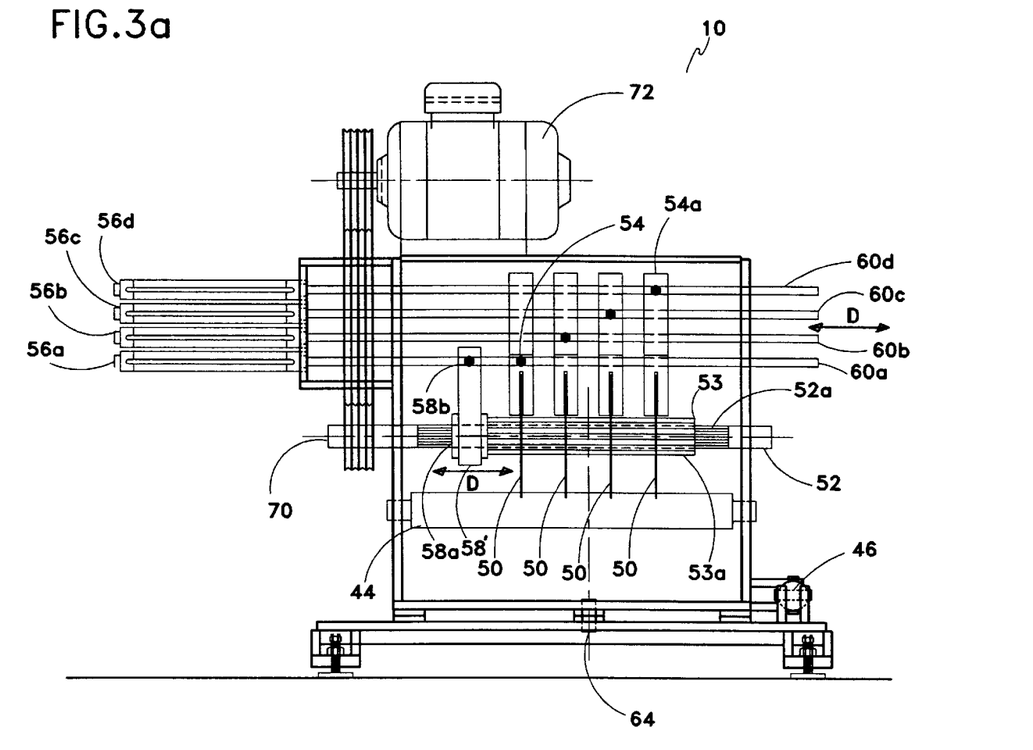
FIG. 3a is an end elevation cross-sectional view according to an alternative preferred embodiment of the present invention.

In a third preferred embodiment, arbor 52 is fixed to Y axis positioning cylinder shaft 60a by a short tie bar 58', such as seen in FIG. 3a. Short tie bar 58' does not extend over Y axis positioning shafts 60b, 60c and 60d. thus, shafts 60b, 60c and 60d cannot be clamped to shaft 60a and translating saws 50 in unison requires continuous active control of all Y axis positioning cylinders.

Use of tie bar 58, which only requires active control of one Y axis positioning cylinder, the remaining cylinders being free floating and tied to the translation of the active cylinder, thus simplifies the required system controls when in operation.

In a fourth preferred embodiment depicted in FIG. 3a, again, arbor 52 is not free to translate laterally. However, in this embodiment, rather than saws 50 sliding relative to arbor 52 in splines directly on arbor 52, a sleeve 53 is splined between saws 50 and arbor 52. Thus, sleeve 53 is free to be laterally positioned relative to arbor 52, being splined thereon by means of internal splines (not shown) slidingly mated onto arbor splines 52a. Saws 50 are to be laterally slid relative to sleeve 53, saws 50 being slidingly mated onto splines 53a.

Thus the target lumber sizes may be preset by selective actuation of Y axis positioning cylinders 56a–56d. Once saws 50 have been prepositioned, active curve sawing and edging is accomplished by translating saws 50 in unison on sleeve 53 as sawbox 10 is actively skewed. In this preferred embodiment, the bar 58' is fixed to Y axis positioning cylinder shaft 60a and rotatably mounted at its other end by means of thrust bearing 58a to sleeve 53. Thus, sleeve 53 and the saw guide 54 mounted to cylinder shaft 60a are physically coupled. In an alternative embodiment, short tie bar 58' may be replaced by a tie bar 58 having actuable clamps 62.

Figure 5:
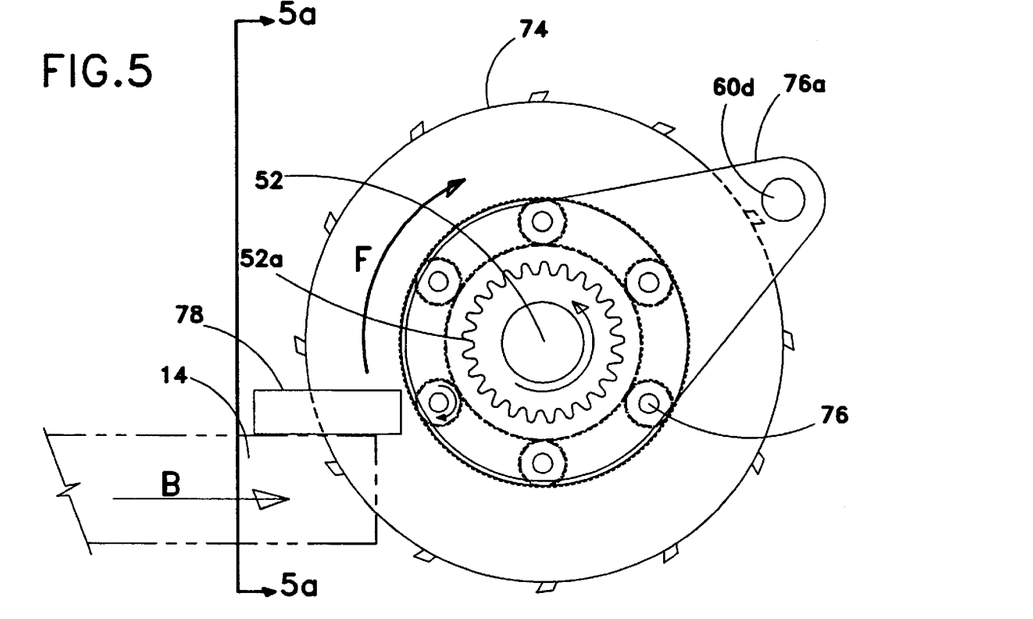
FIG. 5 is a side section view of chip head of an alternative embodiment of the present invention.
Figure 5A:
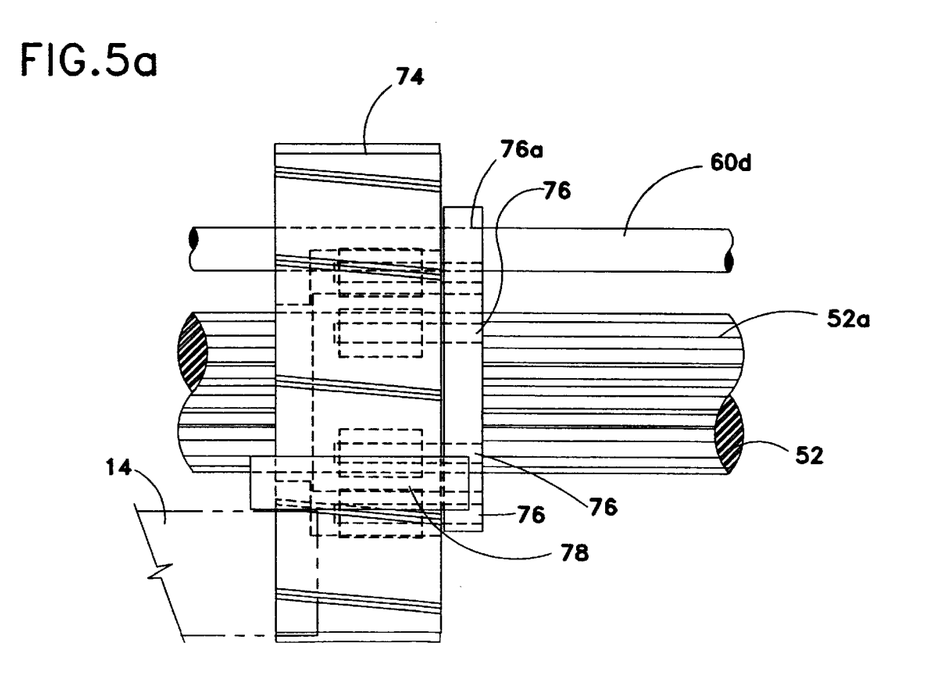

Seen in FIG. 5, chip heads 74 may replace the outer-most of saws 50. Chip heads 74 reduce the slabs or edgings from workpiece 14 into chips as workpiece 14 moves through active sawbox apparatus 10. Chip heads 74 may have internal planetary reduction gears 76 that allow the chip heads to rotate in direction F at an optimum speed, to create quality chips (not shown). Chipping anvils 78 provide shear points for the chipping heads in the production of chips.

As illustrated in FIG. 6, optimizer decision processor 46 and the scanner 38 communicate on a common scanner local area network 80. An ethernet (TM) local area network (LAN) 82, and a network server 84 provide network communications. Modem 86 provides external communications. Man-machine interface 86 and primary workstation 90 also communicate over the ethernet (TM) LAN 82.

The optimizer decision processor 46 and associated network server 84, man-machine interface 88, programmable logic controller (PLC) 92 and primary work station 90 communicate across a common ethernet (TM) LAN 82, which is available as a connection point to existing mill networks. This connection point allows workstations within the existing mill offices (with appropriate software) access to all workpiece optimization functions. A dedicated communications link 94 may exist between the optimizer decision processor 46 and the programmale logic controller (PLC) 92. All workstations and the network server 84 contain software applications which provide mill personnel the tools they require to define their environment (scanner, optimizer, machine center, products, shift schedules, reports) to the workpiece optimizer system; pre-generate various start-up configurations; start, stop and load the system; visually monitor the workpiece 14 as it proceeds through the system; and monitor the operation for unusual conditions. The operators console 96 allows the operator to stop the movement for unusual conditions. The operators console 96 allows the operator to stop the movement of workpiece 14 or divert a workpiece through dropout 20.

Modem 86 attached to the network server 84, and the primary workstation 90 using remote access software and appropriate controls, allows remote dial-up access to the mill site for software reprogramming and remote operation of almost every application and function as well as retrievel of statistics and workpiece summaries for off-site service analysis. The man-machine interface 88 provides operator input and allows the operator access to various levels of machine operation and control. The PLC 92 and motion controllers 98, share the task of monitoring speed and position of the workpiece 14 and controlling positioners.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. An edging and curve-sawing saw for sawing a workpiece translated longitudinally in a first direction along an infeed path comprising:

a skewable sawbox mounted in said infeed path and skewable relative to said infeed path, a saw arbor mounted horizontally in said sawbox, generally laterally across said infeed path, an array of saw blades mounted on said saw arbor, saw spacing means for presetting of lateral spacing between individual saw blades of said array of saw blades.

saw translating means for active translating of said array of saw blades, in unison in a second direction, relative to said sawbox according to an optimized sawing profile, wherein said saw spacing means and said saw translating means are parallel rigid members, said parallel rigid members extending and selectively translatable in said second direction, generally parallel to said saw arbor, saw blade guides rigidly mounted to said parallel rigid members for corresponding translation with said parallel rigid members so as to selectively position said saw blades in said second direction.

2. The saw of claim 1 wherein said parallel rigid members include cylinder shafts selectively positionable by actuation of corresponding positioning cylinders, and wherein said saw translating means further comprises a tie bar rotatably mounted on said arbor and rigidly mounted to a first cylinder shaft of said cylinder shafts so as to extend between said arbor and said first cylinder shaft, said tie bar rotatably mounted on said arbor to allow rotation of said arbor and said saw blades for sawing said workpiece, said tie bar coupled to said arbor by lateral coupling means so that lateral translation of said first cylinder shaft causes corresponding lateral translation of said arbor, actuation of a first positioning cylinder of said positioning cylinders, said first positioning cylinder corresponding to said first cylinder shaft, translating said arbor, said first cylinder shaft, a first saw blade guide of said saw blade guides, and a first saw blade of said array of saw blades corresponding to said first saw blade guide.

3. The saw of claim 1 wherein said saw blades are splined and slidingly mounted on a correspondingly externally splined sleeve, and wherein said sleeve is internally splined and slidingly mounted on external splines on said saw arbor.

4. The saw of claim 2 wherein said tie bar is mounted to all of said cylinder shafts, so that actuation of said first positioning cylinder translates said arbor, said cylinder shafts, said saw blade guides, and said saw blades.

5. The saw of claim 2 wherein said tie bar includes a selectively actuable clamp to selectively couple said tie bar to said first cylinder shaft.

6. The saw of claim 2 wherein said tie bar includes selectively actuable clamps to selectively coupld said tie bar to said cylinder shafts, wherein said positioning cylinders may be independently actuated to preset spacing between said saw blades and said clamps then actuated to couple said tie bar to said cylinder shafts so that said saw blades may be actively laterally translated in unison at said preset saw blade spacing by actuation of said first positioning cylinder.

7. The saw of claim 1 wherein edging end blades at either end of said array of saw blades are chipping heads coupled by gearing means to said saw arbor for optimal rotational speed, in chipping planes parallel to said saw blades, of chipping blades on said chipping heads so as to bring said chipping blades into chip cutting engagement with said workpiece translating generally longitudinally into said sawbox for curve sawing and edging.

8. The saw of claim 7 wherein said sawbox further comprises chipping anvils corresponding to, and cooperating with said chipping heads, said chipping anvils mounted in close adjacency to arcs of rotation of said chipping blades in said chipping planes, so as to lie at least partially in said chipping planes to provide a bearing and shearing surface against which said workpiece may bear so as to shear chips from said workpiece as said chipping blades engage said workpiece in said chip cutting engagement.

9. The saw of claim 8 wherein said chipping anvils are rigid members having generally planar bearing surfaces extending generally horizontally, parallel to said saw arbor, and said chipping blades, as they rotate in said arcs of rotation, form an acute angle relative to said planar bearing surfaces as said chipping blades are rotated past said chipping anvils.

10. The gangsaw of claim 9 wherein said gearing means are reduction gears for reducing said rotational speed of said chipping heads relative to a rate of rotation of said saw blades so as to optimize cutting of said chips from said workpiece.

11. The saw of claim 1 wherein edging end blades at either end of said array of saw blades are chipping heads for chipping edges of said workpiece when said workpiece is translated generally longitudinally into said sawbox for curve sawing and edging.

12. The saw of claim 11 wherein said sawbox further comprises chipping anvils corresponding to, and cooperating with said chipping heads, said chipping anvils mounted in close adjacency to arcs of rotation of chipping blades, mounted on said chipping heads, in said chipping planes, so as to lie at least partially in said chipping planes to provide a bearing and shearing surface against which said workpiece may bear so as to shear chips from said workpiece as said chipping blades engage said workpiece in chip cutting engagement.

13. The saw of claim 12 wherein said chipping anvils are rigid members having generally planar bearing surfaces extending generally horizontally, parallel to said saw arbor, and said chipping blades, as they rotate in said arcs of rotation, form an acute angle relative to said planar bearing surfaces as said chipping blades are rotate past said chipping anvils.

14. In an edging and curve-sawing saw having a sawbox rotatably supporting, on a generally horizontal saw arbor, a plurality of generally vertically aligned saw blades in laterally spaced array, a method for edging and curve sawing comprising the steps of:

(a) skewing and positioning said sawbox in a workpiece infeed path so as to receive a workpiece translated generally longitudinally along said infeed path and into said sawbox, (b) adjusting saw blade spacing within said laterally spaced array by adjustment means mounted to said sawbox, and (c) laterally translating, by saw translating means, said laterally spaced array relative to said sawbox according to an optimized profile as said workpiece is fed through said sawbox.

* * * * *

(12) EX PARTE REEXAMINATION CERTIFICATE (5713rd)
United States Patent
Michell et al.

(10) Number: US 5,946,995 C1
(45) Certificate Issued: Mar. 20, 2007

(54) METHOD AND APPARATUS FOR CURVE SAWING OR TRAVERSE EDGING WITH AN ACTIVE SAWBOX

(75) Inventors: Steven W. Michell, Salmon Arm (CA); Emeric Johnson, Salmon Arm (CA); Brian Stroud, Salmon Arm (CA); James Jackson, Salmon Arm (CA); John Sergeant, Salmon Arm (CA)

(73) Assignee: CAE Wood Products G.P., St-Laurent (CA)

Reexamination Request:
No. 90/007,010, Apr. 15, 2004

Reexamination Certificate for:
Patent No.: 5,946,995
Issued: Sep. 7, 1999
Appl. No.: 08/929,230
Filed: Sep. 9, 1997

Related U.S. Application Data

(60) Provisional application No. 60/019,756, filed on Sep. 9, 1996.

(51) Int. Cl.
*B27B 1/00* (2006.01)

(52) U.S. Cl. .................. 83/425.3; 83/368; 83/371; 83/425.4; 83/485; 83/487; 83/498; 83/508.3; 144/39; 144/357; 144/3.1; 144/378

(58) Field of Classification Search ............... 83/425.3, 83/75.5, 425.4, 508.3; 144/3.1, 357, 378, 144/370, 176, 218, 235, 377
See application file for complete search history.

(56) References Cited

U.S. PATENT DOCUMENTS

| | | | |
|---|---|---|---|
| 201,198 A | 3/1878 | Randolph | |
| 624,753 A | 5/1899 | Clubb | |
| 1,263,443 A | 4/1918 | Lien | |
| 2,149,235 A | 2/1939 | Stone | |
| 2,507,644 A | * 5/1950 | Peters | 83/508.3 |
| 3,093,168 A | 6/1963 | Colt et al. | |
| 3,225,800 A | 12/1965 | Pease | |
| 3,276,492 A | 10/1966 | Kervefors | |
| 3,282,312 A | * 11/1966 | Standal | 144/220 |
| 3,489,189 A | 1/1970 | Thrasher | |
| 3,548,173 A | 12/1970 | Pascoe et al. | |
| 3,566,934 A | 3/1971 | Thrasher | |
| RE27,126 E | 5/1971 | Gingery | |
| 3,630,244 A | 12/1971 | Cromeens | |
| 3,645,304 A | * 2/1972 | Thrasher | 83/821 |
| 3,675,526 A | * 7/1972 | Bush | 83/676 |
| 3,731,175 A | 5/1973 | Hartung | |
| 3,736,968 A | 6/1973 | Mason | |
| 3,742,796 A | 7/1973 | McMillan | |
| 3,750,513 A | 8/1973 | Cromeens | |
| 3,886,372 A | 5/1975 | Sanglert | |
| 3,890,509 A | 6/1975 | Maxey | |
| 4,015,648 A | 4/1977 | Shepard | |
| 4,031,368 A | 6/1977 | Colding et al. | |
| 4,085,636 A | 4/1978 | Eklund | |
| 4,086,496 A | 4/1978 | Berry | |
| 4,127,044 A | 11/1978 | Kenyon | |
| 4,144,782 A | 3/1979 | Lindstrom | |
| 4,188,544 A | 2/1980 | Chasson | |
| 4,210,184 A | 7/1980 | McGriff | |
| 4,248,532 A | 2/1981 | Nosier | |
| 4,283,976 A | * 8/1981 | Wennerstrom | 83/301 |
| 4,336,731 A | 6/1982 | Eklund | |
| 4,358,978 A | 11/1982 | Lawson | |
| 4,359,677 A | 11/1982 | Dennon | |
| 4,422,486 A | * 12/1983 | Maret | 144/131 |
| 4,449,557 A | 5/1984 | Mäkelä et al. | |
| 4,475,422 A | 10/1984 | Lawson | |
| 4,485,861 A | 12/1984 | Nilsson et al. | |
| 4,548,247 A | 10/1985 | Eklund | |
| 4,572,256 A | 2/1986 | Rautio | |
| 4,575,237 A | 3/1986 | Suzuki | |
| 4,599,929 A | 7/1986 | Dutina | |
| 4,633,924 A | 1/1987 | Hasenwinkle et al. | |
| 4,653,560 A | 3/1987 | Wislocker et al. | |
| 4,690,188 A | 9/1987 | Hasenwinkle | |
| 4,702,134 A | 10/1987 | Corley, III | |
| 4,711,279 A | * 12/1987 | Reuter | 144/39 |
| 4,879,659 A | 11/1989 | Bowlin et al. | |
| 4,881,584 A | 11/1989 | Wislocker et al. | |
| 4,922,780 A | 5/1990 | Hurdle, Jr. | |
| 4,926,917 A | 5/1990 | Kirbach | |
| 4,947,336 A | 8/1990 | Froyd | |
| 4,947,909 A | 8/1990 | Stroud | |

| | | |
|---|---|---|
| 4,963,805 A | 10/1990 | Suzuki et al. |
| 4,989,155 A | 1/1991 | Begin et al. |
| 5,090,811 A | 2/1992 | Donaldson |
| 5,132,546 A | 7/1992 | Tower |
| 5,143,127 A | 9/1992 | Rautio |
| 5,213,020 A | 5/1993 | Pleau et al. |
| 5,243,888 A | 9/1993 | Bowlin |
| 5,325,751 A | 7/1994 | Green et al. |
| 5,396,938 A | 3/1995 | Cannaday |
| 5,400,842 A | 3/1995 | Brisson |
| 5,418,731 A | 5/1995 | Yoshimura et al. |
| 5,421,386 A | 6/1995 | Lundström |
| 5,429,161 A | 7/1995 | Allard |
| 5,463,296 A | 10/1995 | Fugere et al. |
| 5,469,904 A | 11/1995 | Kontiainen |
| 5,477,117 A | 12/1995 | Saito |
| 5,500,737 A | 3/1996 | Donaldson et al. |
| 5,551,327 A | 9/1996 | Hamby et al. |
| 5,722,474 A | 3/1998 | Raybon et al. |
| 5,761,979 A | 6/1998 | McGehee |
| 5,870,936 A * | 2/1999 | McGehee .................. 83/13 |
| 5,884,682 A | 3/1999 | Kennedy et al. |

FOREIGN PATENT DOCUMENTS

| | | |
|---|---|---|
| CA | 567994 | 12/1958 |
| CA | 652235 | 11/1962 |
| CA | 2022857 | 8/1990 |
| GB | 2068294 | 8/1981 |

OTHER PUBLICATIONS

Declaration of Antony Edwards submitted in support of COE NEWNES/MCGEHEE ULC Opening Claim Construction Brief, filed Apr. 22, 2005 in the Eastern District of Texas (Case No. 2–04CV–94).

"Curve Sawing Benefits Optimized Multi–Rip Line," Wood Technology, Miller–Freeman, Inc. pp. 27–28 (Mar./Apr. 1994).

"Logging & Sawmilling Journal Calendar," Logging and Sawmilling Journal (L&SJ) and Timberwest Journal, Mar.–Nov. 1996.

Bezier, P., "Numerical Control Mathematics and Applications," John Wiley & Sons, pp. 97–198(1972).

Bradley, A., "Memory Organization," GML Programming Manual for IMC S Class Motion Controllers, Allen–Bradley, pp. 128–130 (1993).

Bradley, A., Product Specification—IMC™ S Class Motion Controllers, Allen–Bradley, (1993).

Gerald, C., et al., "Applied Numerical Analysis," Addison–Wesley Publishing Company, Inc. pp. 210–253 (1994).

Kubik, K., "The Application of Piecewise Polynomials To Problems of Curve and Surface Approximation," Rijkswaterstaat Communications, Nr. 12, pp. 7–22 (1971).

Lancaster, P., et al., "Curve and Surface Fitting An Introduction," Academic Press, pp. 21, 29–111 (1986).

Marciniak, K., "Geometric Modeling for Numerically Controlled Machining," Oxford University Press, pp. 39, 41–65, 136–159 (1991).

Seitz, G., et al., "Resolution Limits of Active Triangulation Systems by Defocusing," Optical Engineering, vol. 32, No., pp. 1374–1383 (1993).

Wang, W., "Accuracy Analysis of An In–Line Optical Coordinate Measuring Machine (IOCMM)," Dissertation submitted to the University of Michigan, Dissertation Abstracts International, pp. 1–182 (1991).

Zecher, J., "Computer Graphics For CAD/CAM Systems," Marcel Dekker, Inc., pp. 147–189 (1994).

Zeid, I., "CAD/CAM Theory and Practice," McGraw–Hill, Inc., pp. 145–147, 162, 171–175, 212–238, 717–719, 740–745, 975–993, 1002–1014, 1019–1024 (1991).

"Electric Linear Actuators & Controls", by author unknown, Published by Industrial Devices Corporation, Novato, California, 1989.

* cited by examiner

*Primary Examiner*—Matthew C. Graham (57) ABSTRACT

An edging and curve-sawing saw has a selectively skewable sawbox, skewable to a workpiece infeed path so as to receive workpieces translated longitudinally along the infeed path and into the sawbox. The sawbox rotatably supports a saw arbor. A plurality of saw blades are slidingly mounted on the saw arbor in a parallel laterally spaced array. The saw blade array spacing is selectively adjustable device mounted to the sawbox. The array is slide on the arbor relative to the sawbox according to an optimized profile.

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 6 and 14 are determined to be patentable as amended.

Claims 2–5 and 7–13, dependent on an amended claim, are determined to be patentable.

1. An edging and curve-sawing saw for sawing a workpiece translated longitudinally in a first direction along an infeed path comprising:
   a skewable sawbox mounted in said infeed path and skewable relative to said infeed path,
   a saw arbor mounted horizontally in said sawbox, generally laterally across said infeed path,
   an array of saw blades mounted on said saw arbor,
   saw spacing means for presetting of lateral spacing between individual saw blades of said array of saw blades[,],
   saw translating means for active translating of said array of saw blades, in unison in a second direction, relative to said sawbox according to an optimized sawing profile *as the workpiece is fed through said sawbox*,
   wherein said saw spacing means and said saw translating means are parallel rigid members,
   said parallel rigid members extending and selectively translatable in said second direction, generally parallel to said saw arbor, saw blade guides rigidly mounted to said parallel rigid members for corresponding translation with said parallel rigid members so as to selectively position said saw blades in said second direction.

6. The saw of claim 2 wherein said tie bar includes selectively actuable clamps to selectively [coupld] *couple* said tie bar to said cylinder shafts, wherein said positioning cylinders may be independently actuated to preset spacing between said saw blades and said clamps then actuated to couple said tie bar to said cylinder shafts so that said saw blades may be actively laterally translated in unison at said preset saw blade spacing by actuation of said first positioning cylinder.

14. [In an edging and curve-sawing saw having a sawbox rotatably supporting, on a generally horizontal saw arbor, a plurality of generally vertically aligned saw blades in laterally spaced array, a method for edging and curve sawing comprising the steps of:] *A method for edging and curve-sawing a workpiece translated longitudinally in a first direction along an infeed path, the method comprising the steps of:*
   (a) [skewing and positioning said sawbox in a workpiece infeed path so as to receive a workpiece translated generally longitudinally along said infeed path and into said sawbox,] *providing a skewable sawbox mounted in said infeed path and skewable relative to the infeed path,*
   (b) [adjusting saw blade spacing within said laterally spaced array by adjustment means mounted to said sawbox, and] *providing a saw arbor mounted in said sawbox, generally laterally across the infeed path,*
   (c) [laterally translating, by saw translating means, said laterally spaced array relative to said sawbox according to an optimized profile as said workpiece is fed through said sawbox.] *providing a laterally spaced array of saw blades mounted on said saw arbor,*
   (d) *providing saw spacing means mounted to said sawbox for presetting of lateral spacing between individual saw blades of said array of saw blades,*
   (e) *providing saw translating means for active translating of said array of saw blades, in unison in a second direction, relative to said sawbox according to an ontimized sawing profile, wherein said saw spacing means and said saw translating means are parallel rigid members extending and selectively translatable in said second direction, generally parallel to said saw arbor, and wherein saw blade guides are rigidly mounted to said parallel rigid members for corresponding translation with said parallel rigid members so as to selectively position said saw blades in said second direction,*
   (f) *skewing and positioning said sawbox in the infeed path so as to receive the workpiece translated longitudinally along the infeed path and into said sawbox,*
   (g) *adjusting saw blade spacing within said laterally spaced array by said saw spacing means, and*
   (h) *laterally translating, by said saw translating means, said laterally spaced array in unison in said second direction relative to said sawbox according to an optimized profile as the workpiece is fed through said sawbox.*

\* \* \* \* \*